United States Patent
Lim et al.

(10) Patent No.: US 11,115,636 B2
(45) Date of Patent: Sep. 7, 2021

(54) IMAGE PROCESSING APPARATUS FOR AROUND VIEW MONITORING

(71) Applicant: LG INNOTEK CO., LTD., Seoul (KR)

(72) Inventors: Sung Hyun Lim, Seoul (KR); Je Yong Shin, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 16/317,413

(22) PCT Filed: Jul. 14, 2017

(86) PCT No.: PCT/KR2017/007571
§ 371 (c)(1),
(2) Date: Jan. 11, 2019

(87) PCT Pub. No.: WO2018/012925
PCT Pub. Date: Jan. 18, 2018

(65) Prior Publication Data
US 2019/0253681 A1     Aug. 15, 2019

(30) Foreign Application Priority Data

Jul. 14, 2016 (KR) .................. 10-2016-0089490
Dec. 5, 2016 (KR) .................. 10-2016-0164418

(51) Int. Cl.
*H04N 5/225*     (2006.01)
*H04N 9/73*     (2006.01)
(Continued)

(52) U.S. Cl.
CPC .............. *H04N 9/73* (2013.01); *G06F 13/38* (2013.01); *G06T 3/4015* (2013.01);
(Continued)

(58) Field of Classification Search
CPC .......... B60R 2300/303; H04N 5/23238; H04N 5/3415; H04N 2013/0088
See application file for complete search history.

(56) References Cited

U.S. PATENT DOCUMENTS

| 9,538,077 B1* | 1/2017 | Huang ............... H04N 5/23238 |
| 2010/0097444 A1* | 4/2010 | Lablans ............. H04N 5/23238 348/46 |

(Continued)

FOREIGN PATENT DOCUMENTS

| KR | 10-2015-0047900 A | 5/2015 |
| KR | 10-2015-0141804 A | 12/2015 |

(Continued)

OTHER PUBLICATIONS

Texas Instruments, DS90UB960 Datasheet, Sep. 2016; (Year: 2016).*

(Continued)

*Primary Examiner* — Twyler L Haskins
*Assistant Examiner* — Dwight Alex C Tejano
(74) *Attorney, Agent, or Firm* — Birch, Stewart, Kolasch & Birch, LLP

(57) ABSTRACT

Disclosed are an image processing apparatus including a deserializer receiving respective Bayer image information pieces acquired from a plurality of cameras; and an image processor processing Bayer data processed and output by the deserializer to produce one stitched image from a plurality of Bayer images acquired from the plurality of cameras, wherein the one stitched image is output.

15 Claims, 9 Drawing Sheets

(51) Int. Cl.
  *G06T 11/60* (2006.01)
  *G06T 3/40* (2006.01)
  *G06T 11/40* (2006.01)
  *H04N 1/387* (2006.01)
  *G06F 13/38* (2006.01)
  *G06T 7/90* (2017.01)
  *G06T 5/00* (2006.01)
  *G06T 5/50* (2006.01)
  *H04N 5/235* (2006.01)
  *H04N 5/247* (2006.01)
  *H04N 9/64* (2006.01)

(52) U.S. Cl.
  CPC ........... *G06T 3/4038* (2013.01); *G06T 5/006* (2013.01); *G06T 5/50* (2013.01); *G06T 7/90* (2017.01); *G06T 11/40* (2013.01); *G06T 11/60* (2013.01); *H04N 1/387* (2013.01); *H04N 1/3876* (2013.01); *H04N 5/2353* (2013.01); *H04N 5/247* (2013.01); *H04N 9/646* (2013.01); *G06T 2207/10024* (2013.01); *G06T 2207/10144* (2013.01); *G06T 2207/20192* (2013.01); *G06T 2207/20212* (2013.01); *G06T 2207/30252* (2013.01)

(56) References Cited

U.S. PATENT DOCUMENTS

| | | | | |
|---|---|---|---|---|
| 2012/0162427 | A1* | 6/2012 | Lynam | B60R 1/00 348/148 |
| 2013/0250114 | A1* | 9/2013 | Lu | H04N 5/23238 348/148 |
| 2014/0160291 | A1* | 6/2014 | Schaffner | B60R 1/00 348/148 |
| 2014/0327774 | A1 | 11/2014 | Lu et al. | |
| 2014/0340510 | A1* | 11/2014 | Ihlenburg | H04N 7/18 348/118 |
| 2014/0347501 | A1* | 11/2014 | Ishida | H04N 5/23238 348/207.1 |
| 2015/0146029 | A1* | 5/2015 | Venkataraman | H04N 13/243 348/218.1 |
| 2015/0353011 | A1 | 12/2015 | Baek et al. | |
| 2016/0173737 | A1 | 6/2016 | Cho | |
| 2016/0198089 | A1* | 7/2016 | Motohashi | H04N 5/247 348/36 |
| 2017/0195564 | A1* | 7/2017 | Appia | H04N 9/045 |
| 2017/0225621 | A1* | 8/2017 | Shiohara | H04N 7/18 |
| 2018/0335503 | A1* | 11/2018 | Seifert | H04R 1/028 |

FOREIGN PATENT DOCUMENTS

| | | |
|---|---|---|
| KR | 10-2016-0051129 A | 5/2016 |
| KR | 10-2016-0071187 A | 6/2016 |
| WO | WO 2014/084730 A1 | 6/2014 |
| WO | WO 2016/093117 A1 | 6/2016 |

OTHER PUBLICATIONS

Miró, "Real-Time Image Stitching for Automotive 360° Vision Systems," A degree's Thesis Submitted to the Faculty of the Escola Técnica d'Enginyeria de Telecomunicació de Barcelona Universitat Politécnica de Catalunya, Jul. 24, 2014, XP055594683, pp. 1-55 (Total pp. 67).

Popovic et al., "Reconfigurable Forward Homography Estimation System for Real-Time Applications," 2014 22nd International Conference on Very Large Scale Integration (VLSI-SOC), IEEE, Oct. 6, 2014, XP032716846, pp. 1-6.

* cited by examiner

COORDINATES INVERSELY REFERRED TO USING LOOK-UP TABLE

IMAGE PROCESSING APPARATUS FOR AROUND VIEW MONITORING

CROSS REFERENCE TO RELATED APPLICATIONS

This application is the National Phase of PCT International Application No. PCT/KR2017/007571, filed on Jul. 14, 2017, which claims priority under 35 U.S.C. 119(a) to Patent Application Nos. 10-2016-0089490, filed in the Republic of Korea on Jul. 14, 2016 and 10-2016-0164418, filed in the Republic of Korea on Dec. 5, 2016, all of which are hereby expressly incorporated by reference into the present application.

TECHNICAL FIELD

Embodiments relate to an image processing apparatus, and more particularly, to an apparatus for processing an image for around view monitoring (AVM).

BACKGROUND ART

Recently, due to the development of automobile industry, a rapid increase in traffic accidents has become a social issue, and thus, research has been actively conducted into a driver assistance system for preventing accidents in advance. The driver assistance system assists a driver in driving or parking a vehicle for safety driving of the driver.

An around view monitoring (AVM) system as one of driver assistance systems has been actively researched recently to provide vehicle surroundings to a driver in the form of an image with a plurality of cameras installed in the system. Various automobile companies from Germany and Japan already develop and release AVM systems in the form of a product. Recently, systems including a plurality of cameras installed therein to provide a bird's eye view as an elevated view of an object from above to a driver have been most mainly used.

An AVM system may generate an image indicating an object, e.g., vehicle surroundings at a viewing angle of 360 degrees using an image acquired by a limited number of cameras through an apparatus for producing an image. In this case, to acquire a wide viewing angle, a fish eye lens or a similar type of wide angle lens may be lens as a lens installed in a camera. However, images acquired by the lens are different from images based on human vision and a lastly output image is a top view type of image compared with a direction of a camera lens installed in a vehicle, and thus, images acquired from a plurality of cameras need to be processed using various image signal processing (ISP) procedures.

Such a series of procedures are required because it is not possible to install a camera in a vehicle to capture a roof of the vehicle from above.

FIG. 1 is a diagram showing a conventional image producing apparatus.

Referring to FIG. 1, a camera unit 10 may include an image acquisition unit 11, a demosaic+ISP unit 12, and a transmission unit 13. An image producing apparatus 20 includes a reception unit 21, a stitching unit 22, and an output unit 23. According to the conventional art, the demosaic+ISP unit 12 is included in the camera unit 10. Alternatively, when the demosaic+ISP unit 12 is included in the image producing apparatus, the image signal processing (ISP) procedure by the demosaic+ISP unit 12 may be sequentially performed after an operation of receiving an image by the reception unit 21, that is, prior to an operation of image stitching (or, image registration) by the stitching unit 22.

That is, according to the conventional art, there is a problem in that units for image signal processing (ISP) are required or an ISP procedure needs to be performed on each image acquired through a plurality of cameras, and thus, a large amount of time and costs are incurred. According to the conventional art, respective camera units perform auto exposure (AE), auto white balance (AWB), or the like in the image signal processing (ISP) operation prior to image stitching, and thus, there is a problem in that regions with different brightness or image quality degrees are present in one stitched image due to a difference in environments in which cameras are installed.

DISCLOSURE

Technical Problem

Embodiments provide a wide image processing apparatus for providing a stitched image with uniform quality.

Embodiments provide an image producing and acquiring vehicle electrical apparatus that transmits a Bayer pattern to an image processing apparatus from a plurality of camera devices installed in a vehicle to reduce the amount of data transmitted through a communication network, thereby managing a high-quality camera device without influence of speed and performance of an in-vehicle communication network.

Further, embodiments provide a vehicle image processing apparatus that stitchs images transmitted from a plurality of camera devices and then performs auto exposure (AE) or auto white balance (AWB) of a plurality of cameras, thereby reducing correction for image stitching so that image distortion may be reduced when a stitched image instead of the images transmitted from the plurality of cameras is displayed to a user or a driver.

It is to be understood that both the foregoing general description and the following detailed description of the embodiments are exemplary and explanatory and are intended to provide further explanation of the embodiments as claimed.

Technical Solution

In one embodiment, a vehicle electrical apparatus for outputting an image may include a plurality of camera devices for outputting a Bayer pattern, an in-vehicle network (IVN) for transmitting the Bayer pattern, and an image processor for processing the Bayer pattern transmitted through the IVN.

The Bayer pattern may have an uncompressed version and may be converted in the format required by the IVN.

The IVN may be managed using a low-voltage differential signaling (LVDS) method, and the Bayer pattern may be included in the Ethernet frame format.

The IVN may be managed using a low-voltage differential signaling (LVDS) method, and the plurality of camera devices may be connected to the image processor through an independent dedicated line.

The camera device may include a lens assembly for collecting introduced optical signals, an image sensor for converting the optical signals collected through the lens assembly into an electrical signal to output the Bayer pattern, and a transmission unit for transmitting the Bayer pattern.

The transmission unit may further include a serializer for serializing the Bayer pattern into serial data for transmission using the LVDS method.

The transmission unit may further include an encoder for converting the serial data in the Ethernet frame format.

The image processor may further include a color interpolation unit for receiving the Bayer pattern and performing color interpolation and demosaicing, a correction unit for performing first image processing on the image transmitted from the color interpolation unit, a stitching unit for stitching images output from the correction unit; and an adjusting unit for adjusting auto exposure (AE) based on an output of the stitching unit.

The first image processing may include performing at least one of calibration, lens distortion correction, color correction, gamma correction, color space conversion, or edge enhancement.

The first image processing may include performing inverse perspective mapping transform for producing a transformation image obtained by removing perspective from an image transmitted from the color interpolation unit.

The image processor may further include a deserializer for receiving the Bayer pattern and converting the Bayer pattern to parallel data to provide parallel data to the color interpolation unit.

The image processor may further include a decoder for extracting the Bayer pattern from the Ethernet frame format when the Bayer pattern is transmitted in the Ethernet frame format.

In another embodiment, a vehicle camera vehicle includes a lens assembly including a plurality of lenses for collecting introduced optical signals, an image sensor for converting the optical signals collected through the lens assembly into an electrical signal to output the Bayer pattern, and a transmission unit for transmitting the Bayer pattern.

The transmission unit may further include a serializer for converting the Bayer pattern into the serial data for transmission using the LVDS method.

The transmission unit may further include an encoder for converting the serial data into the Ethernet frame format.

In still another embodiment, an image processing apparatus may include a color interpolation unit for receiving a plurality of Bayer patterns and performing color interpolation or demosaicing on the Bayer pattern, a correction unit for performing first image processing on a plurality of interpolated image transmitted from the color interpolation unit, a stitching unit for stitching a plurality of corrected image output from the correction unit, and an adjusting unit for adjusting auto exposure of a camera that acquires the plurality of Bayer pattern based on an output of the stitching unit.

The first image processing may include performing at least one of calibration, lens distortion correction, color correction, gamma correction, color space conversion, or edge enhancement.

The first image processing may include performing inverse perspective mapping transform for producing a transformation image obtained by removing perspective from an image transmitted from the color interpolation unit.

The image processing apparatus may further include a deserializer for receiving a plurality of the Bayer patterns and converting the Bayer patterns to parallel data to provide parallel data to the color interpolation unit.

The image processing apparatus may further include a decoder for extracting the Bayer pattern from the Ethernet frame format when the Bayer pattern is transmitted in the Ethernet frame format.

In still another embodiment, an image processing apparatus may include a processing system including at least one memory device for storing a computer program and at least one processor, wherein the processing system may make the image processing apparatus to perform receiving a plurality of Bayer patterns and performing color interpolation or demosaicing on plurality of Bayer patterns to output a plurality of interpolated image, perform first image processing on the plurality of interpolated images to output a plurality of corrected images, and stitch the plurality of corrected images to output a stitched image.

The plurality of Bayer patterns may be transmitted through an in-vehicle network (IVN) that is operatively connected to a plurality of camera devices installed in the vehicle.

The processing system may make the image processing apparatus to further perform converting the plurality of Bayer patterns in the form of serial data in the form of parallel data when the plurality of Bayer patterns are transmitted in the form of serial data.

The processing system may make the image processing apparatus to further perform adjusting auto exposure (AE) of the plurality of camera devices that acquire the plurality of Bayer patterns based on the stitched image.

The first image processing may include performing at least one of calibration, lens distortion correction, color correction, gamma correction, color space conversion, or edge enhancement.

The first image processing may include performing inverse perspective mapping transform for producing a transformation image obtained by removing perspective from the plurality of interpolated images.

In still another embodiment, an image processing method may include receiving a plurality of Bayer patterns and performing color interpolation or demosaicing on the plurality of Bayer patterns to output a plurality of interpolated images, performing first image processing on the plurality of interpolated images to output a plurality of corrected images, and stitching the plurality of corrected images to output a stitched image.

The image processing method may further include adjusting auto exposure (AE) of the plurality of camera devices that acquires the plurality of Bayer patterns based on the stitched image.

The first image processing may include performing at least one of calibration, lens distortion correction, color correction, gamma correction, color space conversion, or edge enhancement.

The first image processing may include performing inverse perspective mapping transform for producing a transformation image obtained by removing perspective from the plurality of interpolated images.

In still another embodiment, a computer readable recording medium may record an application program to be executed by a processor to perform the aforementioned image processing method.

In still another embodiment, an image producing apparatus may be an apparatus for producing a wide angle image and include a processor for processing calculation for stitching a plurality of images to form one image, and a memory for storing at least one program command executed through the processor, wherein the at least one program command may be to be executed to perform receiving a plurality of Bayer images that are captured in real time by a plurality of camera units, stitching the plurality of Bayer images to produce one image in the demosaic form, and image signal processing (ISP) including auto exposure (AE) and auto white balance (AWB) after stitching of one image.

In still another embodiment, an image producing apparatus may an apparatus for producing a wide angle image and include a processor for processing calculation for stitching a plurality of images to form one image, and a memory for storing at least one program command executed through the processor, wherein the at least one program command may be to be executed to perform receiving a plurality of Bayer images that are captured in real time by a plurality of camera units, stitching the plurality of Bayer images to produce one Bayer image, and performing image signal processing (ISP) including auto exposure (AE) and auto white balance (AWB) after stitching of one Bayer image.

In still another embodiment, an image producing apparatus may be an apparatus for producing wide angle image and include a processor for processing calculation for stitching a plurality of images to form one image, and a memory for storing at least one program command executed through the processor, wherein the at least one program command may be to be executed to perform receiving a plurality of Bayer images that are captured in real time by a plurality of camera units, demosaicing on the plurality of Bayer images, stitching the plurality of demosaic images to form one image, and image signal processing (ISP) including auto exposure (AE) and auto white balance (AWB) after stitching of one image.

It is to be understood that both the foregoing general description and the following detailed description of the embodiments are exemplary and explanatory and are intended to provide further explanation of the embodiments as claimed.

Advantageous Effects

The apparatus according to embodiments may have the following effects.

According to the embodiments, one stitched image may be produced with a small amount of time and costs using a plurality of images. In addition, an image with pixels with overall uniform quality may be stitched.

According to the embodiments, the amount of data transmitted to an image processing apparatus from a plurality of cameras may be reduced, and thus, an image acquiring vehicle electrical apparatus to be freely designed from a limitation of an in-vehicle network (IVN) may be provided.

In addition, according to the embodiments, a mismatch between images may be reduced while images acquired from a plurality of cameras are synthesized, thereby reducing distortion in a synthesized image.

It will be appreciated by persons skilled in the art that that the effects that could be achieved with the embodiments are not limited to what has been particularly described hereinabove and other advantages of the embodiments will be more clearly understood from the following detailed description taken in conjunction with the accompanying drawings.

DESCRIPTION OF DRAWINGS

Arrangements and embodiments may be described in detail with reference to the following drawings in which like reference numerals refer to like elements and wherein.

BEST MODE

Figure 1:
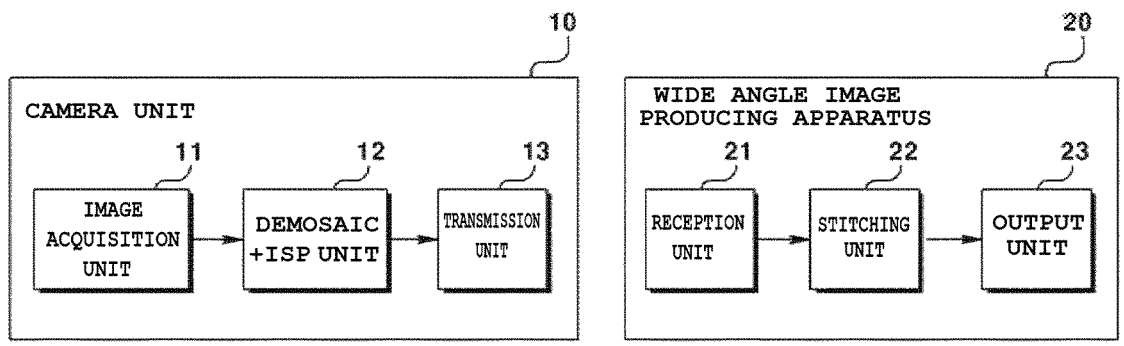
FIG. 1 is a diagram showing a wide angle image producing apparatus according to the conventional art.

Exemplary embodiments can be variously changed and embodied in various forms, in which illustrative embodiments are shown. However, exemplary embodiments should not be construed as being limited to the embodiments set forth herein and any changes, equivalents or alternatives which are within the spirit and scope of the embodiments should be understood as falling within the scope of the embodiments.

It will be understood that although the terms first, second, third etc. may be used herein to describe various elements, these elements should not be limited by these terms. These terms are only used to distinguish one element from another element. For example, a first element may be termed a second element and a second element may be termed a first element without departing from the teachings of the embodiments. The term "and/or" includes any and all combinations of one or more of the associated listed items.

It will be understood that when an element is referred to as being "connected to" or "coupled to" another element, it may be directly connected or coupled to the other element or intervening elements may be present. In contrast, when an element is referred to as being "directly connected to" or "directly coupled to" another element or layer, there are no intervening elements present.

The terms used in the present specification are used for explaining a specific exemplary embodiment, not limiting the present inventive concept. Thus, the singular expressions in the present specification include the plural expressions unless clearly specified otherwise in context. Also, terms such as "include" or "comprise" may be construed to denote a certain characteristic, number, step, operation, constituent element, or combination thereof, but may not be construed to exclude the existence of or possibility of addition of one or more other characteristics, numbers, steps, operations, constituent elements, or combinations thereof.

Unless otherwise defined, all terms including technical and scientific terms used herein have the same meaning as commonly understood by one of ordinary skill in the art to which this inventive concept pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments will be described with reference to the annexed drawings. To aid in the easy understanding of a description of the embodiments, the same elements are denoted by the same reference numerals in the drawings, and a repeated explanation thereof will not be given.

Figure 2:
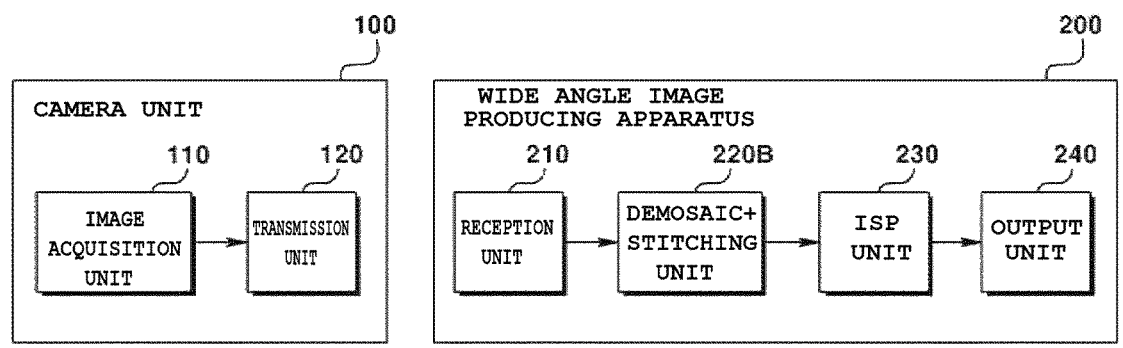
FIGS. 2 to 4 are diagrams showing a wide angle producing apparatus according to different embodiments.

FIG. 2 is a diagram showing an image producing apparatus according to an embodiment.

Referring to FIG. 2, a camera unit may include an image acquisition unit 110 and a transmission unit 120.

An image sensor such as a complementary metal-oxide semiconductor (CMOS) or a charge coupled device (CCD) for converting light transmitted through a camera lens into an electrical signal may correspond to the image acquisition unit 110.

The transmission unit 120 may transmit an image acquired by the image acquisition unit 110 to a reception unit 210 of an image producing apparatus 200.

Referring back to FIG. 2, the image producing apparatus 200 according to the embodiment may include the reception unit 210, a demosaic+stitching unit 220B, an image signal processing (ISP) unit 230, and an output unit 240.

Here, the demosaic+stitching unit 220B and the ISP unit 230 may be embodied by a processor for ISP and a memory for storing at least one program command executed through the processor, which is used to perform each operation of a method of producing an image according to another embodiment. The above description may also be applied to another embodiment.

The reception unit 210 may receive a Bayer image transmitted by the transmission unit 120.

The demosaic+stitching unit 220B may perform a demosaic and image stitching procedure on Bayer images received by the reception unit 210 to generate one image. Here, the Bayer image received by the reception unit 210 may preferably a plurality of Bayer images. That is, the Bayer image may preferably be a plurality of Bayer images acquired by the plurality of image acquisition units 110 included in a plurality of cameras.

The demosaic+stitching unit 220B may simultaneously perform demosaic and stitching procedures, and in this regard, a detailed description thereof will be described with regard to an image producing method according to another embodiment.

Here, one image may preferably be an image in the form of a bird's eye view or a top view, which is used for around view monitoring (AVM).

The ISP unit 230 may perform a signal processing (ISP) operation on one image formed via stitching in the demosaic form. The ISP operation will be described in detail with regard to a method of producing an image according to another embodiment.

The output unit 240 may output an image corrected through the demosaic operation and the ISP operation to a display device or the like.

Figure 3:
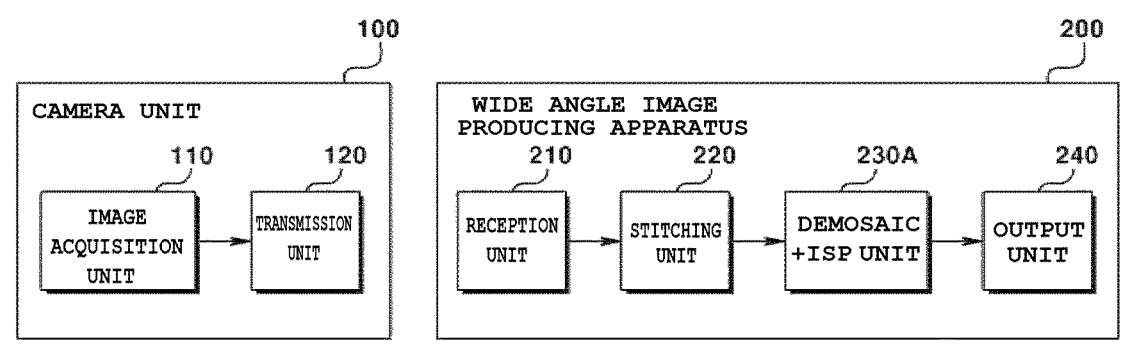

FIG. 3 is a diagram showing the image producing apparatus 200 according to another embodiment. Only a difference with FIG. 2 will be described below.

Referring to FIG. 3, the image producing apparatus 200 according to the embodiment may include the reception unit 210, a stitching unit 220, a demosaic+ISP unit 230A, and the output unit 240. Compared with FIG. 2, a demosaic unit may be included in an ISP unit. Accordingly, the demosaic+ISP unit 230A may perform a demosaic procedure and an ISP procedure on one stitched Bayer image.

Figure 4:
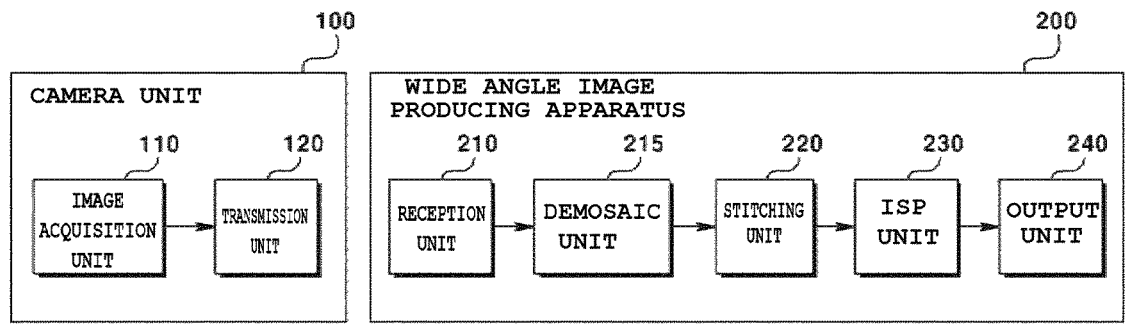

FIG. 4 is a diagram showing an image producing apparatus according to another embodiment. Only a difference with FIG. 2 will be described below.

Referring to FIG. 4, the image producing apparatus 200 according to the embodiment may include the reception unit 210, a demosaic unit 215, the stitching unit 220, the ISP unit 230, and the output unit 240. Compared with FIGS. 2 and 3, the demosaic unit 215 may be independent. Accordingly, the demosaic unit 215 may perform a demosaic operation on a plurality of Bayer images before a plurality of Bayer images are stitched to form one image.

Figure 5:
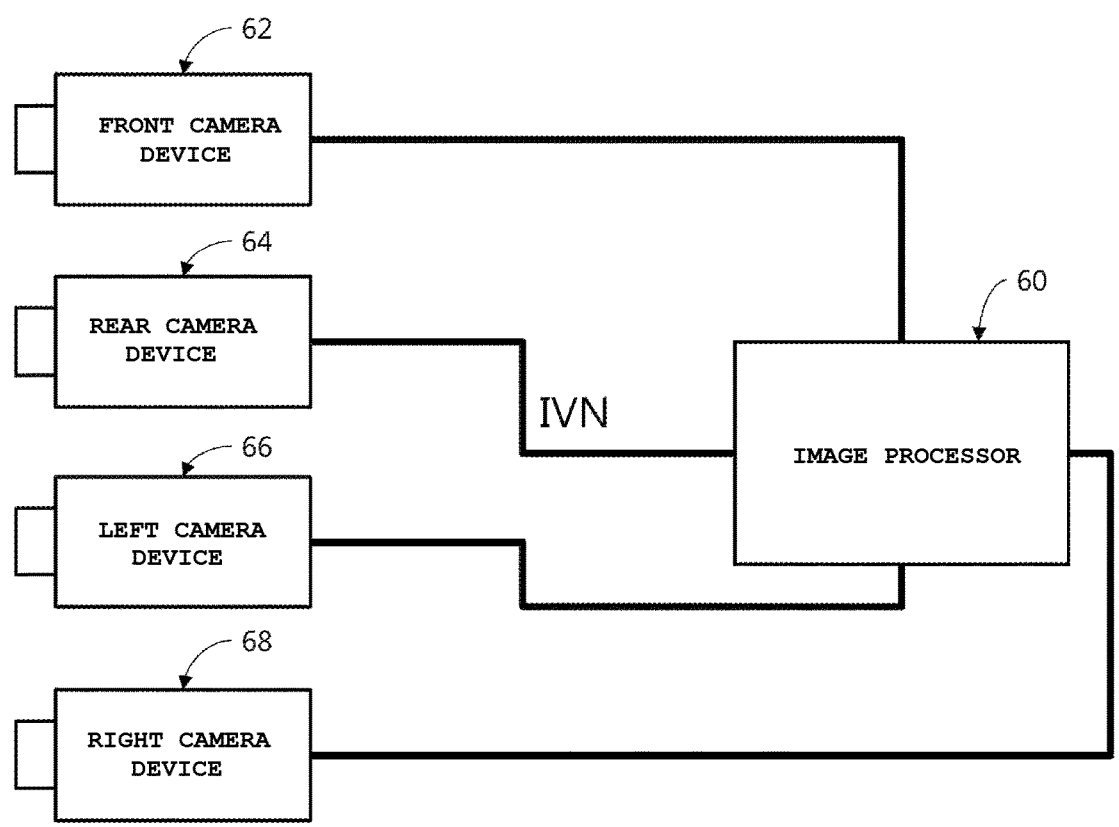
FIG. 5 is a diagram for explanation of a first example of a vehicle electrical apparatus for outputting an image.

FIG. 5 is a diagram for explanation of a first example of a vehicle electrical apparatus for outputting an image.

Referring to FIG. 5, the vehicle electrical apparatus for outputting an image may include a plurality of camera devices 62, 64, 66, and 68 for outputting a Bayer pattern, an in-vehicle network (IVN) for transmitting a Bayer pattern, and an image processor (or, image processing apparatus) 60 for processing the Bayer pattern transmitted through a communication network for a vehicle.

In detail, a vehicle electrical apparatus for outputting an image, that is, an image producing apparatus for a vehicle may include a plurality of camera devices, for examples, a front camera device 62, a rear camera device 64, a left camera device 66, a right camera device 68, and the image processor 60. Here, the front camera device 62, the rear camera device 64, the left camera device 66, and the right camera device 68 may be connected to the image processor 60 through a dedicated communication line.

The number of plurality of cameras included in the image producing apparatus for a vehicle may be changed depending on the size of a vehicle, a viewing angle of a camera, a purpose of the image producing apparatus for a vehicle, or the like.

The plurality of camera devices 62, 64, 66, and 68 may be connected to the image processor 60 through an in-vehicle network (IVN). In this case, the IVN may support serial communication such as low voltage differential signaling (LVDS). The IVN may include a communication network using a plurality of methods such as CAN, LIN, MOST, and FlexRay. Thereamong, today, the CAN has been constantly used as vehicle network architecture in all automobile fields to a body from a power train, and an LIN bus is a simple and economical method, and thus, may be appropriate to exchange signal data in a convenience area that is not a driving area in which safety needs to be considered. In addition, a FlexRay and MOST bus may be used to replace the CAN when real time requirements are increased and a wider bandwidth is required. Recently, low-voltage differential signaling (LVDS) for use of Ethernet has been proposed as a communication network for connection of a plurality of components in a vehicle, and is advantageous to have a physical layer with full-duplex transmission speed of 100 Mbit/s when two wire cables are used as an unshielded twisted pair in a similar manner as the CAN.

The plurality of camera devices 62, 64, 66, and 68 included in the image producing apparatus for a vehicle may transmit a Bayer pattern to the image processor 60 through an in-vehicle network (IVN). Here, the Bayer pattern may include raw data output by an image sensor for converting an optical signal included in a camera device or a camera module into an electrical signal.

For example, an optical signal transmitted through a lens included in a camera device or module may be converted into an electrical signal through respective pixels for detection of R, G, and B colors disposed on an image sensor. When the specification of the camera device or module is 5 million pixels, it may be deemed that the camera device or module includes an image sensor including 5 million pixels capable of detecting of R, G, and B colors. The number of pixels is 5 million, but in reality, the respective pixels are a combination of monochrom pixels for detecting only brightness of black and white instead of detection of color and any one of R, G, and B filters. That is, the image sensor may be configured in such a way that R, G, and B color filters are arranged with a specific pattern on monochrom pixel cells disposed by the number of pixels. The R, G, and B color patterns are disposed to cross each other according to visual characteristics of a user (that is, the human) and is referred to as a Bayer pattern.

A general camera device or module outputs data in the form of an image via a procedure (color interpolation or demosaicing) of receiving a Bayer pattern from an image sensor and coloring the Bayer pattern, and on the other hand, the plurality of camera devices 62, 64, 66, and 68 described with reference to FIG. 5 may output a Bayer pattern. Compared with data in the form of an image, the Bayer pattern has a much smaller amount of data. Accordingly, even if low-voltage differential signaling (LVDS) with full-duplex transmission speed of 100 Mbit/s is used, safety of a driver or a user who uses a vehicle may not be affected. In addition, the amount of data transmitted through an in-vehicle communication network may be reduced, and even if this method is used in an autonomous vehicle, a problem due to a communication method, communication speed, etc. when surrounding information acquired from a plurality of camera devices disposed in a vehicle is analyzed may be removed.

Figure 6:
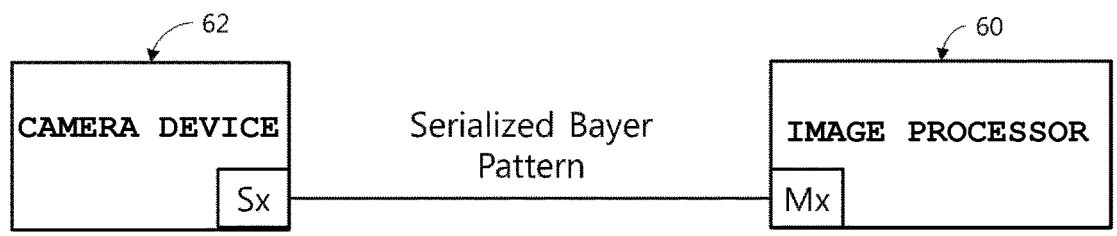
FIG. 6 is a diagram for explanation of connection of an image processing apparatus and the camera module for a vehicle described with reference to FIG. 5.

FIG. 6 is a diagram for explanation of connection of an image processing apparatus and the camera module for a vehicle described with reference to FIG. 5.

As shown in the drawing, a camera device 62 may be separately connected to the image processor 60. In this case, the camera device 62 may be connected to the image processor in a slave mode Sx and the image processor 60 may be connected to the camera device 62 in a master mode Mx via serial communication such as low-voltage differential signaling (LVDS).

The camera device 62 may serialize a Bayer pattern output from an image sensor into serial data and may then transmit the serialized Bayer pattern to the image processor 60. When the camera device 62 and the image processor 60 are independently connected to each other through a serial communication method, it may be advantageous that two devices transmit and receive data with a required amount of data and required speed in synchronization of each other without being limited to preset communication speed.

The camera device 62 does not necessarily compress data for transmission of a Bayer pattern. In general, when communication speed is limited in communication between two different devices, it is required to transmit as large amount data as possible in a limited time via data compression, but when the camera device 62 and the image processor 60 are independently connected to each other through a serial communication method, a Bayer pattern in an uncompressed state may be simply serialized in the form of serial data and may be transmitted.

Figure 7:
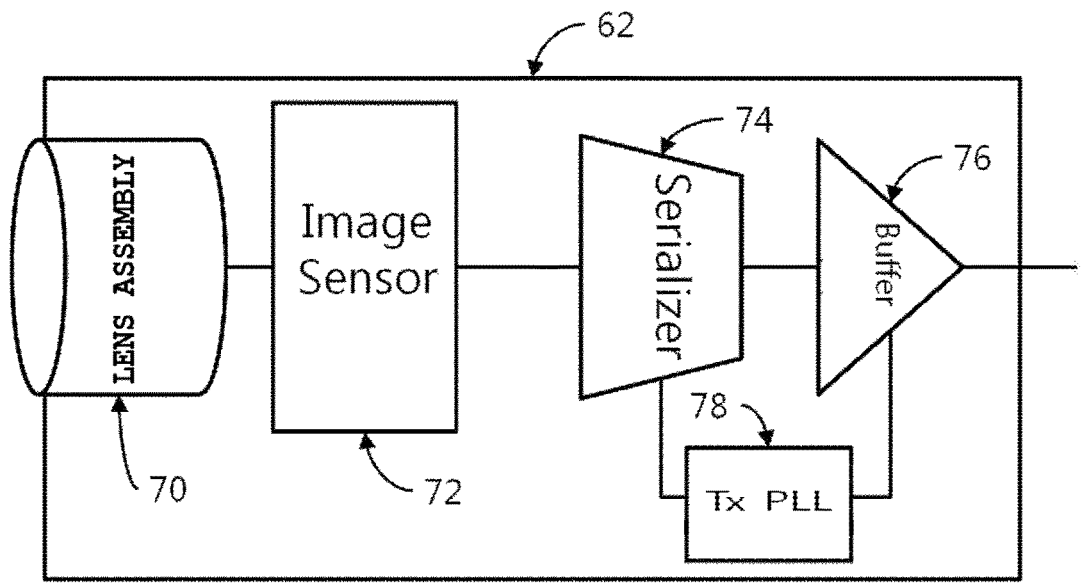
FIG. 7 is a diagram for explanation of an example of the camera module for a vehicle described with reference to FIG. 5.

FIG. 7 is a diagram for explanation of an example of the camera module for a vehicle described with reference to FIG. 5.

Referring to FIG. 7, a vehicle camera module 62 may include a lens assembly 70 including a plurality of lenses for collecting an optical signal input thereto, an image sensor 72 for converting the optical signal collected through the lens assembly 70 into an electrical signal to output a Bayer pattern, and a transmission unit for transmitting the Bayer pattern. Here, the configuration of the transmission unit may be changed depending on an in-vehicle communication network through which the vehicle camera module 62 is connected to the image processor 60 (refer to FIG. 6).

For example, the transmission unit may include a serializer 74 for serializing the Bayer pattern into serial data to transmit the Bayer pattern using a serial communication method such as a low-voltage differential signaling (LVDS) method. In general, the serializer 74 may include a buffer 76 for temporally data and a phase locked loop (PLL) 78 for forming a period of transmitted data or may be embodied therewith.

Figure 8:
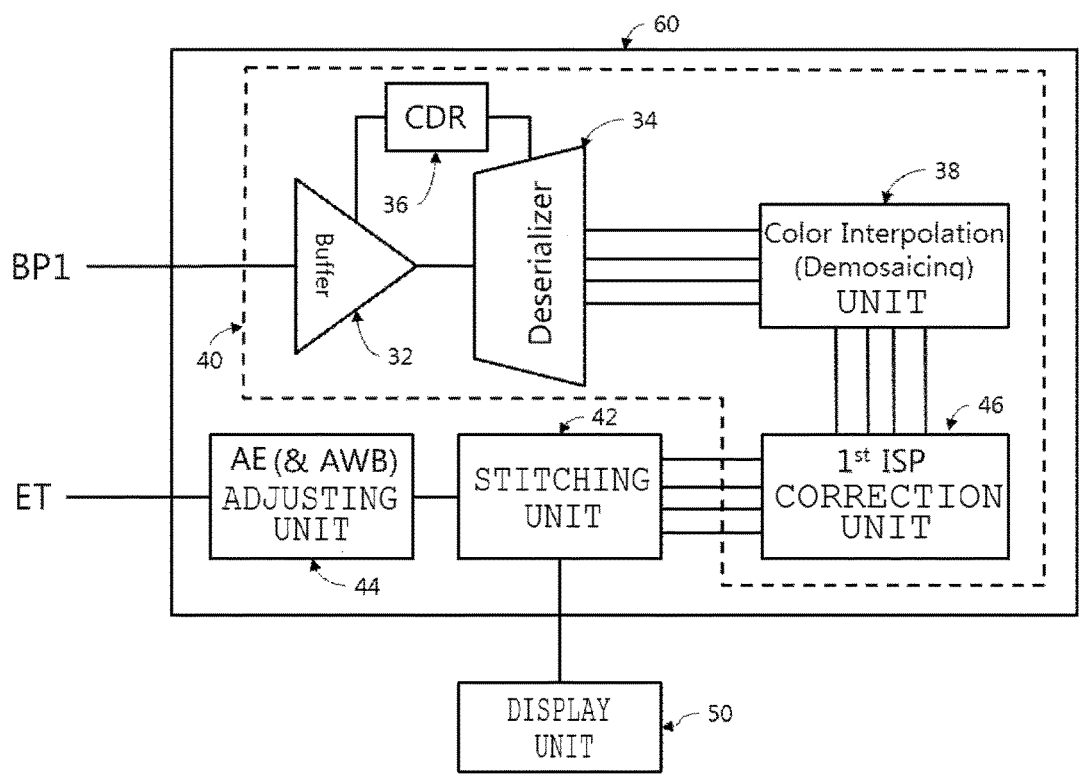
FIG. 8 is a diagram for explanation of an example of the image processing apparatus described with reference to FIG. 5.

FIG. 8 is a diagram for explanation of an example of the image processing apparatus 60 described with reference to FIG. 5.

Referring to FIG. 8, an image processing apparatus 60 may include an image producing unit 40 for producing an image based on Bayer patterns that are separately transmitted from different camera devices, a stitching unit 42 for stitching each image, and an adjusting unit 44 for controlling auto exposure (AE) of a plurality of camera devices based on the stitched image.

In detail, the image producing unit 40 in the image processing apparatus 60 may include a color interpolation (demosaicing) unit 38 for receiving a plurality of Bayer patterns BP1 and performing color interpolation and demosaicing on the plurality of Bayer patterns BP1, and a correction unit 46 for performing first image processing on the plurality of interpolated images transmitted from the color interpolation (demosaicing) unit.

The image processing apparatus 60 may further include an adjusting unit 44 for adjusting auto exposure (AE) of a camera that acquires a plurality of Bayer patterns based on an output of the stitching unit 42.

The image processing apparatus 60 may receive the plurality of Bayer patterns BP1 from a plurality of camera devices through the in-vehicle network (IVN) (refer to FIG. 5). The image processing apparatus 60 may receive the plurality of Bayer patterns BP1 and may then convert each of the plurality of Bayer patterns BP1 into data in the form of an image. After the Bayer patterns BP1 are converted into a plurality of images and then the plurality of images may be stitched. Then, the stitched image may be transmitted to a display device 50 for displaying the stitched image to a user or a driver, and a control signal ET for adjusting auto exposure (AE) of a camera based on the stitched image may be output.

In particular, images acquired by respective camera devices are not individually displayed to the user, but instead, at least two images are stitched and the stitched image is displayed to the user, and thus, when auto exposure (AE) of a camera is adjusted based on the stitched image, the image processing apparatus 60 may provide images obtained from respective cameras to the user while reducing degradation in image quality.

The image processing apparatus 60 may further include a deserializer 34 that receives the Bayer pattern BP1, serializes the Bayer pattern BP1 into parallel data, and provides the parallel data to the color interpolation (demosaicing) unit 38. Differently from a general camera device that outputs data in the form of an image, the camera device or camera module described with reference to FIGS. 5 and 6 may output the Bayer pattern BP1. The Bayer pattern BP1 is serialized in the form of serial data to be transmitted through an in-vehicle network (IVN) for supporting serial communication, and thus, it may be requested again to convert the Bayer pattern BP1 received in the form of serial data in the form of parallel data to perform color interpolation and demosaicing based on the Bayer pattern BP1.

For example, the image processing apparatus 60 may include a plurality of deserializers 34 to independently restore the Bayer patterns BP1 transmitted from different camera devices to Bayer patterns output by image sensors included in the respective camera devices. However, in some embodiments, compared with speed at which a Bayer pattern is transmitted through an in-vehicle network (IVN), an operation speed of an integrated circuit, and so on, in which the image producing unit 40 is embodied may be faster from several times to several tens times. Accordingly, it may be more efficient that the image processing apparatus 60 includes one deserializer 34 and a multiplexer (not shown) depending on the cases than in the case in which the image processing apparatus 60 includes the plurality of deserializers 34. Here, the multiplexer may receive the plurality of Bayer patterns BP1 transmitted through an in-vehicle network (IVN), and sequentially, may transmit the plurality of Bayer patterns BP1 to the deserializer 34. Then, the deserializer may restore the sequentially transmitted plurality of Bayer patterns BP1 to perform color interpolation thereon.

In some embodiments, when the image processing apparatus 60 includes the plurality of deserializers 34, the Bayer pattern restored by the plurality of deserializers 34 may be transmitted to the color interpolation (demosaicing) unit 38, but when the image processing apparatus 60 includes one deserializer 34, the restored Bayer pattern may be transmitted to the color interpolation (demosaicing) unit 38 by using a demultiplexer.

In some embodiments, the deserializer 34 and the color interpolation (demosaicing) unit 38 may be connected to each other through a plurality of lines for transmitting the plurality of Bayer patterns or one line for transmitting the plurality of Bayer patterns.

The color interpolation (demosaicing) unit 38 may apply non-adaptive algorithms or adaptive algorithms on the transmitted Bayer pattern BP1 to perform color interpolation.

Data converted in the form of an image in the color interpolation (demosaicing) unit 38 may be transmitted to the correction unit 46 that performs first image processing. Here, in some embodiments, the first image processing may include performing at least one of color correction, gamma correction, color space conversion, and edge enhancement.

In some embodiments, the color interpolation (demosaicing) unit 38 and the correction unit 46 may be embodied as one unit or module or may be simultaneously embodied by combining different multiple algorithms. When color interpolation and correction are performed on the Bayer pattern in this manner, an image may be obtained and may be stored in a storage medium (not shown).

The stitching unit 42 may perform at least one of calibration, lens distortion correction, and inverse perspective mapping transform for generating a transformation image from which perspective is removed. The correction unit 46 may selectively include a software algorithm, a hardware circuit, or the like, which performs various functions according to specifications required by an image processing apparatus.

For example, the stitching unit 42 may perform calibration on image data output from the color interpolation (demosaicing) unit 38 and may apply the result to lens distortion correction. Here, calibration may include required correction because an actual three-dimensional 3D space seen with the eye of a user is converted into a two-dimensional 2D image upon being photographed by a camera device. For example, positions on a 2D image, in which 3D points are formed, may be determined depending on a position and direction of a camera when the camera captures the image, and in this regard, an actual image is largely affected by instrumental factors in the camera, such as a used lens type, a distance between a lens and an image sensor, and an angle between the lens and the image sensor, and thus, to acquire positions of an image, to which 3D points are projected, or to inversely restore 3D coordinates in space from image coordinates, such internal factors need to be removed to achieve accurate calculation. In this case, a procedure of acquiring a parameter value of such an internal factor may correspond to a calibration operation of a camera device.

The stitching unit 42 may perform lens distortion correction based on the calibration result. For example, an image acquired by a camera device using a super wide angle lens or a wide angle lens with a wide viewing angle (FOV) may provide a wide range, but may be distorted toward an edge from the center of the image. Such lens distortion may include radial distortion, tangential distortion, and the like, and to overcome such distortion, the correction unit 46 may use modeling for projecting a normalized image plane from which influence of an internal parameter of a camera is removed.

The stitching unit 42 may perform an operation of producing a transformation image formed by removing perspective from an image. For example, to transform an image acquired by a camera module installed in a vehicle in the form of a top view image, it may be required to remove a perspective effect with respect to objects and things in the image. When there is information on the height and angle at which a camera is installed in a vehicle, and horizontal and vertical viewing angles of the camera, a relationship between an image plane acquired by the camera and an actual plane (a target image plane in the form of top view) to be viewed to a driver or a user may be recognized. Based on the relationship, the image plane acquired by the camera may be converted into the plane to be viewed to the user.

The stitching unit 42 may determine whether an image is stitched, i.e., a target image to be stitched among a plurality of images in response to a user input and may determine whether each image is converted in a specific form or format. When a user does not intend to stitch a plurality of images, the stitching unit 42 does not necessarily perform an unnecessary stitching procedure. In addition, when the user wants an image acquired by a camera device without change, the stitching unit 42 may not necessarily perform conversion such as removal of perspective.

A plurality of images obtained by receiving a plurality of Bayer patterns and converting the Bayer patterns through the plurality of image producing units 40 may be combined by the stitching unit 42. The stitched image may be transmitted to the adjusting unit 44 for outputting a control signal ET for adjusting auto exposure (AE) of a plurality of camera devices as well as to the display device 50. In some embodiments, the adjusting unit 44 may be a part of a controller (not shown) for controlling a plurality of camera devices. Here, the controller may be a module that is included in the image processing apparatus 60 and controls a plurality of camera devices based on the stitched image for various purposes.

For example, in some embodiments, the adjusting unit 44 may perform auto white balance (AWB) and so on as well as auto exposure (AE) of a plurality of devices. Here, AWB is a procedure of matching color temperature of a scene to be photographed through a camera device with color temperature set by the camera device. The adjusting unit 44 may apply color temperature in the range of about 2000 to 10000 K and may automatically set optimum white balance.

Figure 9:
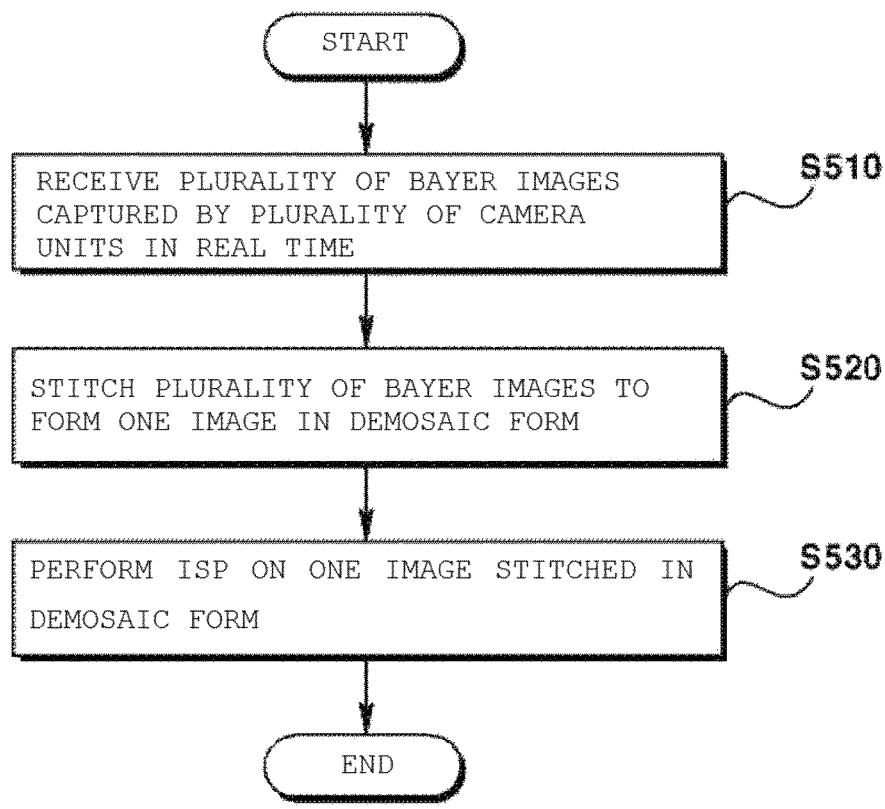
FIG. 9 is a flowchart showing a method of producing a wide angle image according to another embodiment.

FIG. 9 is a flowchart showing a method of producing a wide angle image according to another embodiment.

Referring to FIG. 9, the view angle image producing method according to another embodiment may include receiving a plurality of Bayer images that are photographed by a plurality of camera units in real time (S510), stitching the plurality of Bayer images to form one image in the demosaic form (S520), and performing image signal processing (ISP) on one image stitched in the demosaic form (S530).

First, the reception unit 210 may receive the plurality of Bayer images that are transmitted by the transmission unit 120 and are photographed by a plurality of camera units 100 in real time (S510). Here, the plurality of images may be Bayer images. Each pixel constituting the Bayer image may include only one information piece of R, G, and B.

Then, the demosaic+stitching unit 220B may generate one image in the demosaic form using the plurality of Bayer images (S520). In other words, the demosaic+stitching unit 220B may simultaneously perform demosaic and stitching procedures using the plurality of Bayer images to generate one image in the demosaic form.

Here, one image in the demosaic form may be an image in the form of a bird's eye view or a top view, which is used for around view monitoring (AVM).

Each of a demosaic procedure and a stitching procedure of multiple procedures by the demosaic+stitching unit 220B will be first described and a method in which the two procedures are simultaneously performed will be described below.

First, the demosaic procedure may be a procedure in which an image sensor such as a complementary metal-oxide semiconductor (CMOS) or a charge coupled device (CCD) transforms the form of an image produced while converting light into an electrical signal. At an early stage of creation of an image sensor, it is not possible to contain all R, G, and B information pieces in one semiconductor layer, and thus, the image sensor is invented in such a way that only one information piece of R, G, and B information is contained in one pixel. Accordingly, in the demosaic procedure, each pixel may be corrected via interpolation to contain entire RGB information using one information piece of R, G, and B and one information piece of R, G, and B of surrounding pixels. For the reason, the demosaic procedure of converting respective pixels of an image seen like mosaic into color pixels including entire RGB information may also be referred to as an interpolation procedure.

Then, a procedure of stitching a plurality of Bayer images to form one image may be a procedure in which some pixels extracted from all pixels of each of a plurality of Bayer images are combined to generate one image. That is, the stitching procedure may be an operation of connecting pixels corresponding to the same object area among the some pixels and producing one image.

For example, when a first camera attached to a radiator grille of an object, that is, a vehicle to head for front, a second camera attached to a right side-view mirror of the vehicle to head in a right direction, a third camera attached to a trunk hood of the vehicle to head in a rear direction, and a fourth camera attached to a left side-view mirror of the vehicle to head in a left direction are installed in a target vehicle, a common region with the same object region may be present in images captured by the respective cameras. For example, viewed clockwise, a right region of the first camera and a left region of the second camera may be a common region, a right region of the second camera and a left region of the third camera may be a common region, a right region of the third camera and a left region of the fourth camera may be a common region, and a right region of the fourth camera and a left region of the first camera may be a common region. Based on pixels present in common regions extracted from images with different viewpoints, four independent images are stitched to form one image via a correction procedure.

Here, the stitching procedure of an image may include sub procedures therein.

Figure 10:
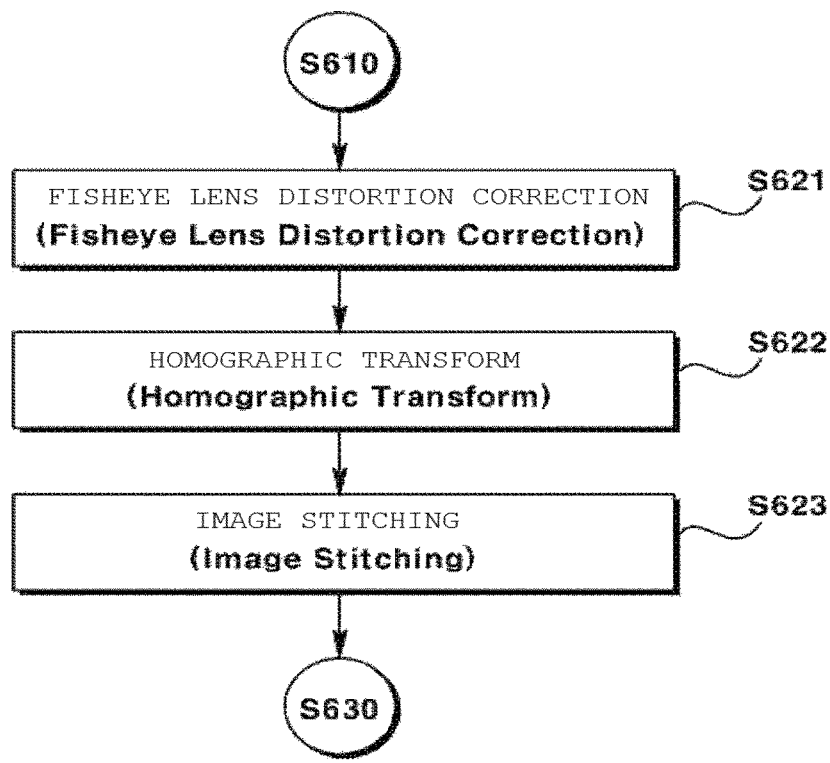
FIG. 10 is a flowchart of a stitching procedure in operation S520 of FIG. 9.

FIG. 10 is a flowchart of a stitching procedure in operation S520 of FIG. 9.

Referring to FIG. 10, the procedure of stitching a plurality of images to form one image may include fisheye lens distortion correction S621, homographic transform S622, and image stitching S623.

Each operation is a well known technology, and thus, will be simply described below.

First, the fisheye lens distortion correction S621 may be an operation of correcting the distortion of an image captured by a wide angle lens. When one image is produced using a plurality of images, stitching may be performed in such a way that one image generally indicates 360 degrees. Accordingly, when a limited number of cameras are used, a lens of each camera may use a wide angle lens to widen a viewing angle. The wide angle lens has a wide viewing angle similarly to a fish view, but may distort an image. Accordingly, a procedure of correcting an image viewed by the fish eye to an image viewed by the human eye may be the above fisheye lens distortion correction operation.

Then, the homographic transform S622 may be an operation of indicating a plurality of images corresponding different views on one plane in the form of a top view and connecting overlapping regions of a plurality of images to each other. This operation may also be referred to uniformity.

Then, the image stitching S623 may be an operation of producing a single image by connecting overlapping regions of a plurality of images obtained in the homographic transform operation.

The aforementioned procedure of stitching a plurality of images to form one image may be applied to a plurality of image pairs that are acquired over time, one by one, but may be simply performed using a look-up table.

The method using the look-up table is a well known technology, and thus, will be simply described below. The look-up table may indicate an address of an original image, corresponding to each pixel of one image formed via stitching.

An image output through the fisheye lens distortion correction, homographic transform, and image stitching operations constituting the stitching procedure may include repeated procedures in an environment in which a position of an installed camera is not changed. That is, a camera referred to by each pixel constituting one image and a pixel address may be common even if time flows. Accordingly, a look-up table indicating addresses of pixels constituting a stitched image may be obtained through one sampling procedure. Then, one stitched image may be produced instead of performing an image stitching procedure one by one using the look-up table.

A multiple procedure in which the demosaic and stitching procedures are simultaneously performed by the demosaic+ stitching unit 220B may be completed using the look-up table. Hereinafter, the multiple procedure will be described in detail from an inputting operation of a plurality of Bayer images.

Figure 11:
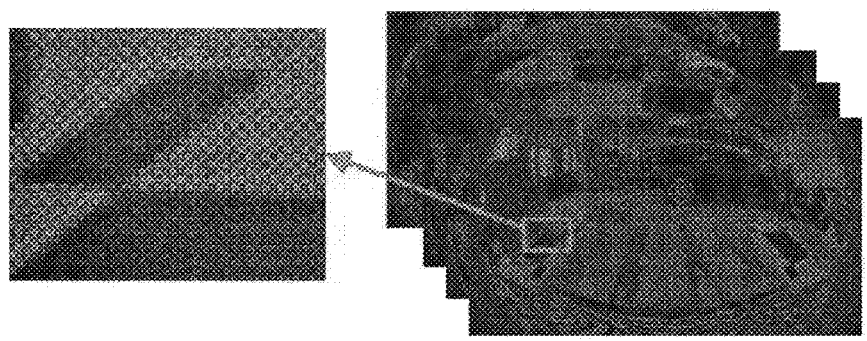
FIGS. 11 to 16 are diagrams for explanation of an example of an entire operation of FIG. 9.

FIG. 11 is a diagram showing Bayer images of the plurality of images.

Referring to FIG. 11, the Bayer images are an image in the mosaic form, and pixels constituting each image include only one information piece of RGB information. Here, although four images are shown, four cameras or more may be installed in the virtual vehicle and may capture four images or more.

Figure 12:
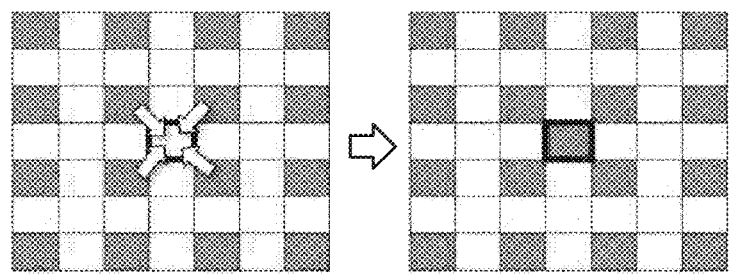

FIG. 12 is a diagram showing an example of an interpolation method with reference to four surrounding pixels in the demosaic procedure.

Referring to FIG. 12, pixels of a region indicated by four arrows may be interpolated referring to RGB values of pixels of a surrounding region indicated with red.

Figure 13:
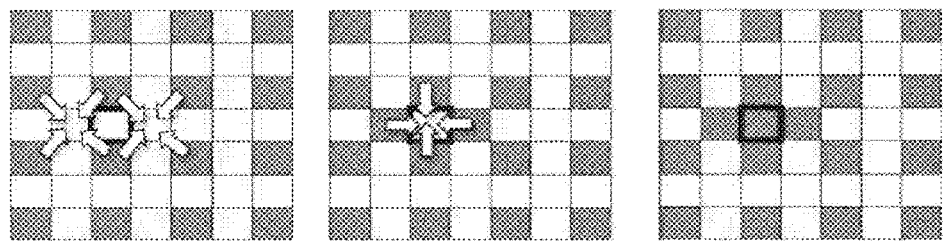

FIG. 13 is a diagram showing an example of an interpolation method with reference to six surrounding pixels in the demosaic procedure.

Referring to FIG. 13, when a pixel in which an RGB value is empty is present among four pixels, the pixel may be interpolated referring to six surrounding pixels.

In a multiple procedure of demosaicing and stitching, a completely demosaiced and stitched sample image may be pre-produced. A look-up table showing an image referred to by pixels constituting the sample image and indicating pixel coordinates of the referred image may be written. In addition, pixels of an image to be produced via stitching may inversely refer to the referred image and the pixel coordinates using the look-up table, and thus, one stitched image may be configured.

The look-up table may record information (information on a point of an input image as a referring target, information on how a plurality of input images is stitched, etc.) required to synthesize an output image.

The look-up table may be configured in a matrix with the same pixel number as an output image and a plurality of matrices may be required depending on a stitching method. Each element of a matrix may be selected in a data type such as an integer type or a floating point type as necessary.

For example, when an output image is produced with reference to a position of a floating point of one image, a matrix in a data type with total two floating points may be required to record X and Y coordinates of a referred image.

As another example, when an output image is produced with reference to a position of a floating point of two images, a matrix with total four floating point data type may be required to record X and Y coordinates of a first referred image, and X and Y coordinates of a second referred image, and one integer type matrix may be required to record a mark indicating a method of stitching two images.

In addition, a size allocated to a recording device may be determined depending on accuracy at which an output image is indicated in an integer or floating point type.

Figure 14:
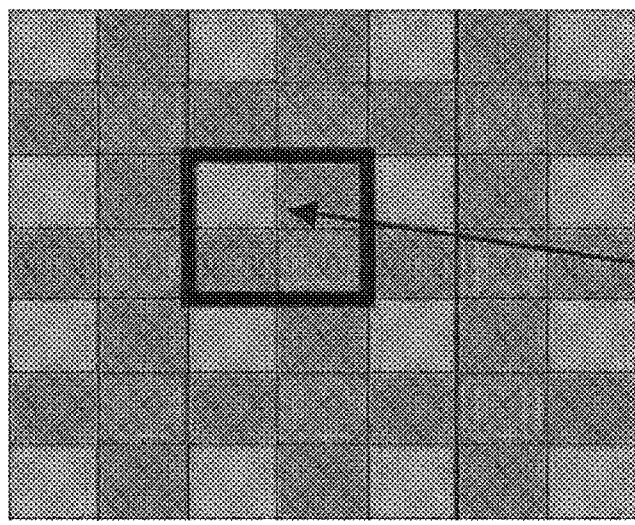

FIG. 14 is a diagram showing an example showing coordinates that are inversely referred to in demosaic and stitching procedures of a plurality of Bayer images using a look-up table.

FIG. 14 shows coordinates referred to of an image referred to by pixels of an image to be produced via stitching using the look-up table.

Figure 15:
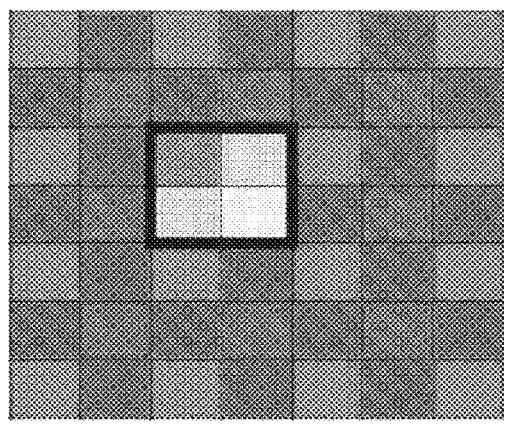

FIG. 15 is a diagram showing an example of a demosaic procedure using four pixels around the coordinates.

It may be possible to simultaneously perform synthesis and demosaicing via bilinear interpolation using the four pixels around the indicated coordinates based on the look-up table.

Figure 16:
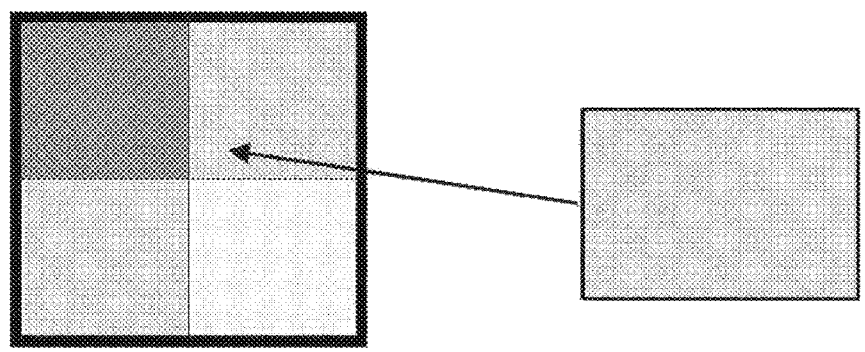

FIG. 16 is a diagram showing an example of bilinear interpolation using RGB of the four pixels.

Referring to FIG. 16, information of any one of pixels of an image to be produced via stitching may be generated as a value interpolated using RGB values of the four pixels.

Referring back to FIG. 16, the ISP unit 230 may lastly perform ISP on one image stitched in the demosaic form (S530).

The image signal processing (ISP) operation may include a plurality of sub procedures therein. For example, the ISP operation may include one or more of gamma correction, color correction, auto exposure correction, and auto white balance procedures. These procedures correspond to a well known technology, and thus, a detailed description thereof is omitted herein.

Figure 17:
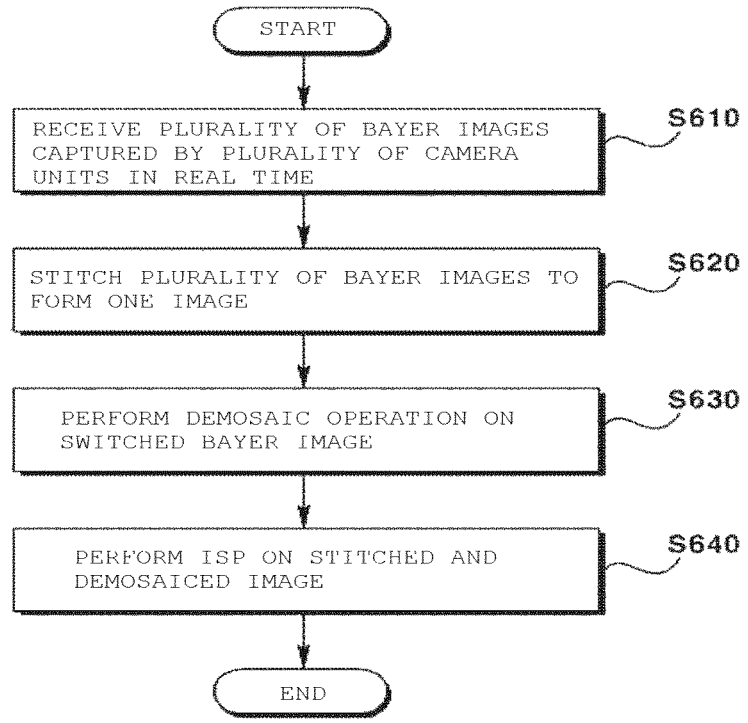
FIG. 17 is a flowchart of a wide angle image producing method according to a second embodiment related to FIG. 3.

FIG. 17 is a flowchart of a wide angle image producing method according to a second embodiment related to FIG. 3.

Referring to FIG. 17, the wide angle image producing method according to another embodiment may include receiving a plurality of Bayer images that are captured in real time by a plurality of camera units (S610), performing stitching to form one Bayer image using the plurality of Bayer images (S620), demosaicing the stitched Bayer image (S630), and performing an image signal processing (ISP) operation on the stitched and mosaic image (S640).

First, the reception unit 210 may receive the plurality of Bayer images that are captured in real time by the plurality of camera units 100 and transmitted by the transmission unit 120 (S610).

Then, the stitching unit 220 may stitch the plurality of Bayer images received by the reception unit 210 to form one image (S620).

Then, the demosaic+ISP unit 230A may perform a demosaic operation on the stitched Bayer image (S630).

Then, the demosaic+ISP unit 230 may perform the ISP operation on one stitched and demosaiced image (S640).

Lastly, one image formed by performing the demosaic operation and the ISP operation on one stitched image may be produced, and the output unit 240 may output a corrected image to a display device or the like.

Figure 18:
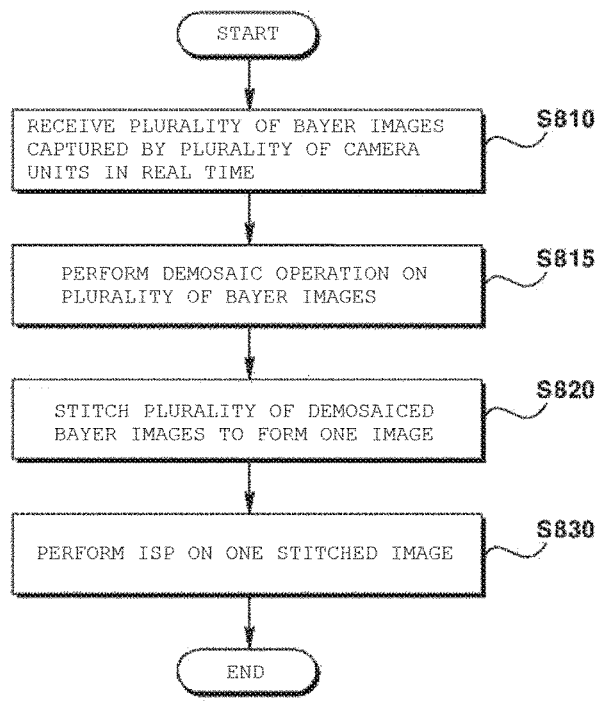
FIG. 18 is a flowchart of a wide angle image producing method according to a third embodiment related to FIG. 4.

FIG. 18 is a flowchart of a wide angle image producing method according to a third embodiment related to FIG. 4.

Compared with FIG. 9, referring to FIG. 18, an operation (S815) of performing a demosaic operation on the plurality of received Bayer images (S815) may be performed between an operation of receiving a plurality of images that are captured in real time by a plurality of camera units (S810) and an operation of stitching one image (S820).

Figure 19:
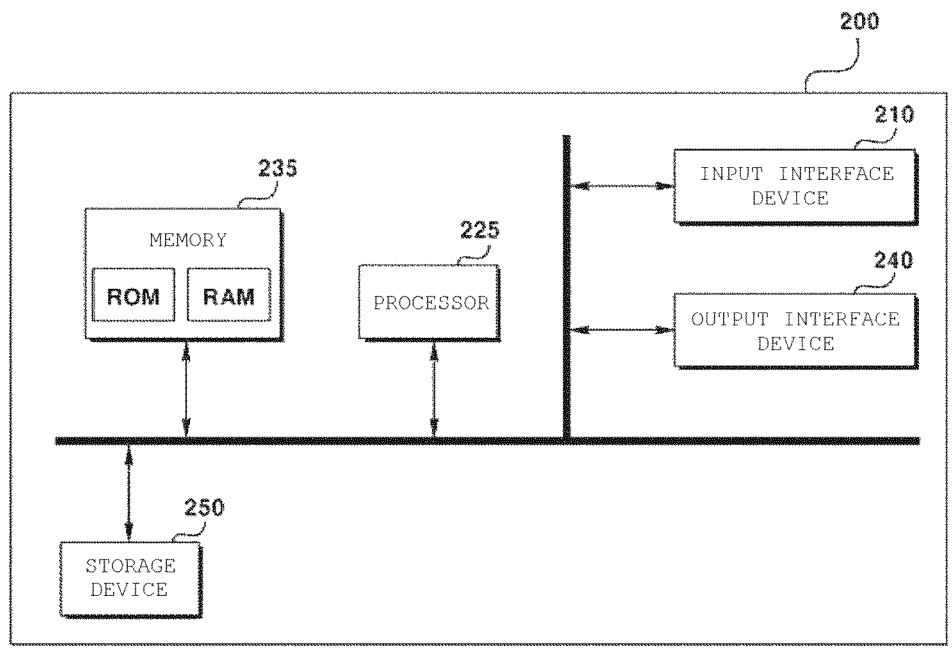
FIG. 19 is a block diagram of a wide angle image producing apparatus according to still another embodiment.

FIG. 19 is a block diagram of a wide angle image producing apparatus according to still another embodiment.

Referring to FIG. 19, the wide angle image producing apparatus 200 according to still another embodiment may include a processor 225 for performing calculation for stitching of one wide angle image using a plurality of images, and a memory 235 for storing at least one program command executed by the processor 225, and in addition, may include an input interface device 210 for receiving a plurality of images, an output interface device 240 for outputting a completely corrected image, and a non-volatile storage device 250.

Here, at least one program command may be executed to perform an operation of receiving a plurality of images that are captured in real time by a plurality of camera units, an operation of stitching a plurality of images to form one image, and an operation of image signal processing (ISP) on the one stitched image.

The processor 225 may execute a program command stored in the memory 235 and/or the storage device 250. The processor 225 may correspond to a central processing unit (CPU), a graphics processing unit (GPU), or a dedicated processor for performing the methods according to embodiments. The memory 235 and the storage device 250 may include a volatile storage medium and/or a non-volatile storage medium. For example, the memory 235 may include a read only memory (ROM) and/or a random access memory (RAM).

In FIGS. 1 to 4 (block diagrams of the configuration) according to embodiments, although respective components are shown and exemplified in different blocks for convenience of description, the components may be configured in one block. For example, the components may be configured in a controller, a processor, or the like to perform a series of operations.

According to embodiments, one stitched image may be produced using a plurality of images with a small amount of time and costs. In addition, an image including pixels with overall uniform quality may be stitched.

Figure 20:
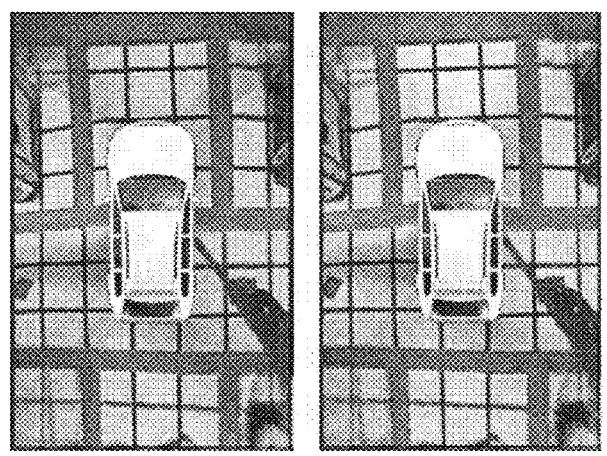
FIG. 20 is a diagram showing an example of comparison of effects according to embodiments.

FIG. 20 is a diagram showing an example of comparison of effects according to embodiments.

Referring to FIG. 20, a left image is an output image when stitching is performed after demosaic and ISP procedures are performed according to the conventional art, and a right image is an output image when an ISP procedure is lastly performed according to the first embodiment. Compared with the left image, as seen from the right image, overall enhanced image quality may be obtained, and uniform brightness and uniform color are shown in front, right, rear, and left side regions.

Figure 21:
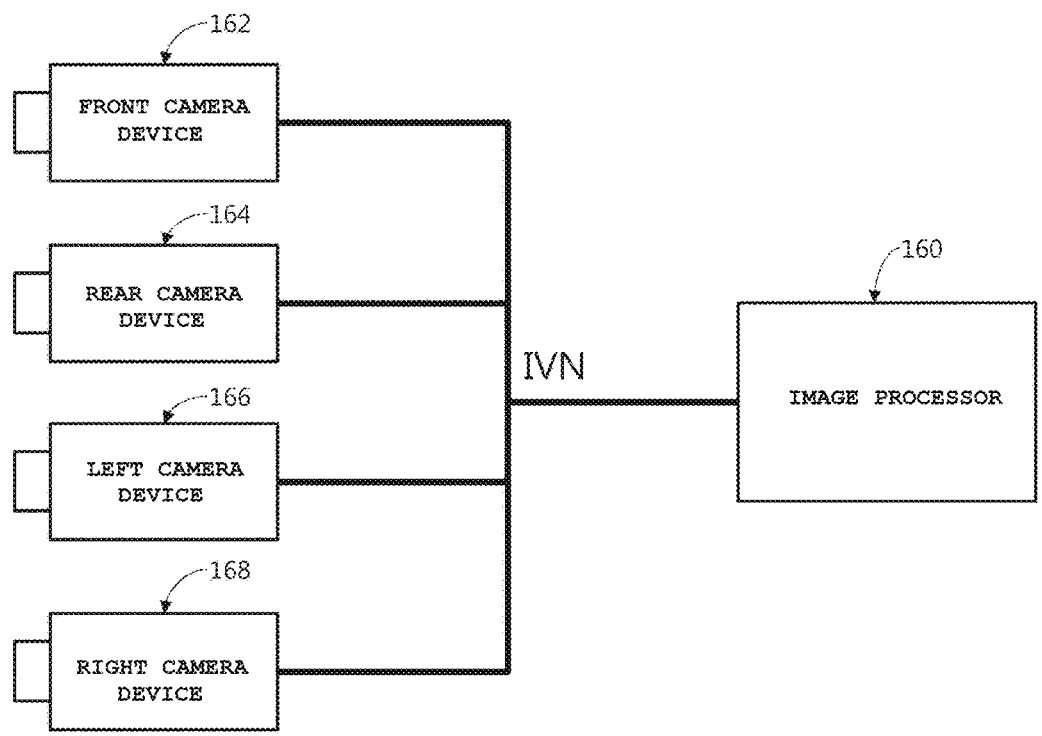
FIG. 21 is a diagram for explanation of a second example of a vehicle electrical apparatus for outputting an image.

FIG. 21 is a diagram for explanation of a second example of a vehicle electrical apparatus for outputting an image.

Referring to FIG. 21, a vehicle electrical apparatus for outputting an image may be similar to the description given with reference to FIG. 5. However, FIG. 21 is different from FIG. 5 in that a plurality of camera devices 162, 164, 166, and 168 and an image processor 160 are connected through a common network rather than being separately connected through an independent dedicated line. That is, an in-vehicle network (IVN) may use a common network for connecting a plurality of components or may use a common network between at least the plurality of camera devices 162, 164, 166, and 168 and the image processor 160.

When the common network is used, each of the plurality of camera devices 162, 164, 166, and 168 may each indicate a source sending data or a receiver receiving data in respective transmitted data, and the image processor 160 need to receive data and to identify a source of the data. However, it may be disadvantageous that the number of input and output terminals of the image processor 160 is reduced and the image processor is more flexibly designed.

Figure 22:
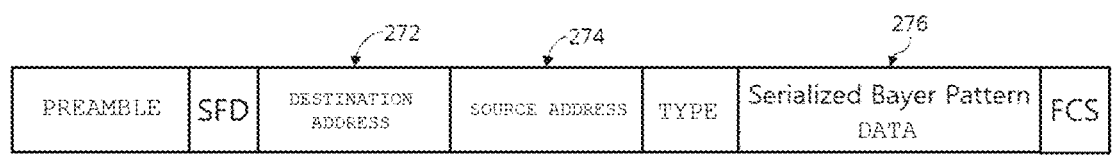
FIG. 22 is a diagram for explanation of connection of the camera module for a vehicle and the image processing apparatus described with reference to FIG. 21.

FIG. 22 is a diagram for explanation of a type of a data transmitted via the in-vehicle network (IVN) described with reference to FIG. 21.

Referring to FIG. 22, low-voltage differential signaling (LVDS) of the in-vehicle network (IVN) may support Ethernet-type communication. In this case, it may be possible to connect one image processor 160 and the plurality of camera devices 162, 164, 166, and 168 according to 1:n. To this end, data form transmitted by each of the camera devices 162, 164, 166, and 168 may include a destination address 272, a source address 274, and data 276. The data form may include a frame check sequence (FCS) field, super fine detail (SFD) information for checking image quality, and so on.

A data frame shown in FIG. 22 may be merely an example, and may be changed depending on an in-vehicle network (IVN) used to connect one image processor 160 and the plurality of camera devices 162, 164, 166, and 168 according to 1:n.

Figure 23:
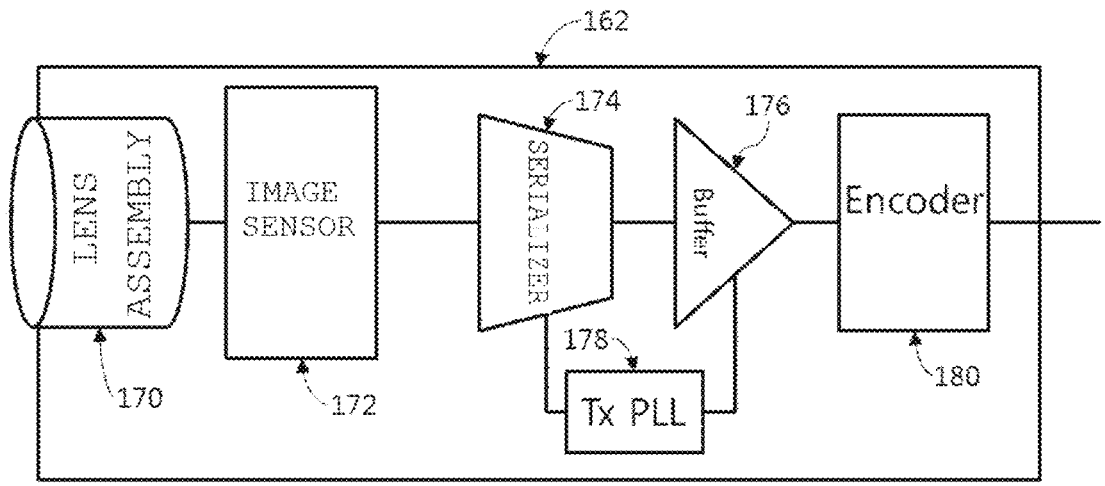
FIG. 23 is a diagram showing an example of the vehicle camera module described with reference to FIG. 21.

FIG. 23 is a diagram showing an example of the vehicle camera module described with reference to FIG. 21.

Referring to FIG. 23, a vehicle camera module 162 may have a similar structure as the vehicle camera module 62 described with reference to FIG. 7, but may further include an encoder 180 for converting a Bayer pattern in the form of serial data in the form of a data frame to be used in a common network when being connected to the common network.

Figure 24:
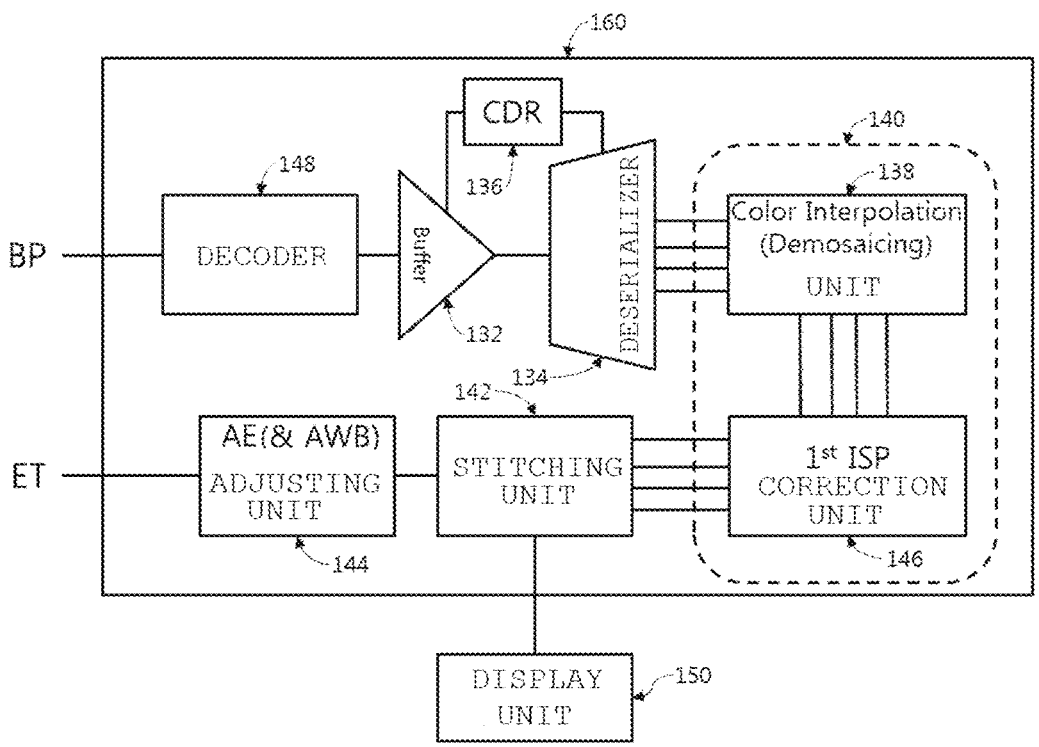
FIG. 24 is a diagram for explanation of an example of the image processing apparatus described with reference to FIG. 21.

FIG. 24 is a diagram for explanation of an example of the image processing apparatus described with reference to FIG. 21.

Referring to FIG. 24, an image processing apparatus 160 may have a similar structure to the image processing apparatus 60 described with reference to FIG. 8, but may further include a decoder 148 for receiving and decoding a data frame including the transmitted Bayer pattern(BP).

In this case, a plurality of deserializers 134 may not be required. When data transmitted from a plurality of cameras is sequentially transmitted through a common network and a camera device from which the data is transmitted is verified through the decoder 148, parallelized data may be distributed to a plurality of image generation units 140 in response to corresponding information.

The image generation unit 140 including a color interpolation (demosaicing) unit 138 and a correction unit 146 may perform color interpolation on parallelized data and may correct the data to produce an image.

A plurality of produced images may be combined by a stitching unit 142, and the combined images may be provided to a user through a display device 150, and may be transmitted to a correction unit 144 to adjust auto exposure (AE) of a camera or adjust auto white balance (AWB) of the camera.

Although embodiments have been described with reference to a number of illustrative embodiments thereof, it should be understood that numerous other modifications and embodiments can be devised by those skilled in the art that will fall within the spirit and scope of the principles of this disclosure.

The invention claimed is:
1. An image processing apparatus, comprising:
a deserializer configured to receive respective Bayer image information pieces acquired from a plurality of cameras; and
an image processor configured to:

process Bayer data processed and output by the deserializer to produce one stitched image from a plurality of Bayer images acquired from the plurality of cameras, after producing the one stitched image, perform a demosaicing operation on the one stitched image to generate a stitched demosaiced image, perform an image signal processing (ISP) operation on the stitched demosaiced image to generate an output stitched image that is demosaiced and corrected, and adjusting an auto exposure and an auto white balance of one or more of the plurality of cameras based on the output stitched image, wherein the output stitched image is output, and wherein the ISP operation includes edge enhancement and at least one of gamma correction, color correction, auto exposure correction or auto white balance adjustment.

2. The image processing apparatus of claim 1, wherein each of the Bayer image information pieces is Monochrome data, and the stitched demosaiced image corresponds to data including color of an RGB or YUV manner.

3. The image processing apparatus of claim 1, wherein each of the Bayer image information pieces is transmitted through an independent network line.

4. An image processing apparatus, comprising:

a reception unit configured to receive a plurality of different data obtained by serializing Bayer image information through a plurality of independent network lines; and an image processor configured to:

process a plurality of Bayer data to output one stitched image, after producing the one stitched image, perform a demosaicing operation on the one stitched image to generate a stitched demosaiced image, perform an image signal processing (ISP) operation on the stitched demosaiced image to generate an output stitched image that is demosaiced and corrected, and adjust an auto exposure and an auto white balance of one or more of a (plurality of cameras based on the output stitched image, wherein the stitched demosaiced image is an RGB or YUV image, and wherein the ISP operation includes edge enhancement and at least one of gamma correction, color correction, auto exposure correction or auto white balance adjustment.

5. The image processing apparatus of claim 4, wherein the reception unit includes a deserializer for restoring and outputting the plurality of data transmitted through the plurality of independent network lines.

6. The image processing apparatus of claim 4, wherein the reception unit includes:

a multiplexer configured to receive the plurality of data from the plurality of independent network lines; and a deserializer configured to restore the plurality of data that are sequentially transmitted through the multiplexer to output the plurality of Bayer data.

7. The image processing apparatus of claim 4, wherein the network line is operated using a low-voltage differential signaling (LVDS) method.

8. The image processing apparatus of claim 4, wherein the image processor includes:

at least one interpolation correction unit configured to perform color interpolation and correction processing on the plurality of Bayer data to output a plurality of image data; and a conversion and stitching unit configured to convert the plurality of image data to correspond to the stitched image and then stitch the converted image.

9. The image processing apparatus of claim 8, further comprising a storage unit configured to store the plurality of image data output from the at least one interpolation correction unit and transmit the plurality of image data according to a request of the conversion and stitching unit.

10. An image processing apparatus, comprising:

a plurality of camera devices configured to output a Bayer pattern;

an in-vehicle network (IVN) transmitting the Bayer pattern; and an image processor configured to:

process the Bayer pattern transmitted through the IVN to produce one stitched image, and after producing the one stitched image, perform a demosaicing operation on the one stitched image to generate a stitched demosaiced image, perform an image signal processing (ISP) operation on the stitched demosaiced image to generate an output stitched image that is demosaiced and corrected, and adjust an auto exposure and an auto white balance of one or more of a plurality of cameras based on the output stitched image, wherein the ISP operation includes edge enhancement and at least one of gamma correction, color correction, auto exposure correction or auto white balance adjustment.

11. The image processing apparatus of claim 10, wherein the Bayer pattern has an uncompressed version and is converted in a format required by the IVN.

12. The image processing apparatus of claim 10, wherein each of the plurality of camera devices is connected to the image processor through an independent dedicated line.

13. The image processing apparatus of claim 10, wherein the plurality of camera device comprises:

a lens assembly configured to collect optical signals;

an image sensor configured to convert the optical signals collected through the lens assembly into an electrical signal to output the Bayer pattern; and a transmission unit configured to transmit the Bayer pattern.

14. The image processing apparatus of claim 13, wherein the transmission unit comprises a serializer configured to convert the Bayer pattern into serial data for transmission using a low-voltage differential signaling method.

15. The image processing apparatus of claim 14, wherein the transmission unit further comprises an encoder configured to convert the serial data in an Ethernet frame format.

* * * * *